United States Patent [19]
Barthelemy

[11] 3,854,115

[45] Dec. 10, 1974

[54] ECHO CORRELATION SYSTEM FOR SUBMARINE DETECTION USING ACTIVE SOUNDING DEVICES

[75] Inventor: Robert Lucien Barthelemy, Toulon, France

[73] Assignee: Etat Francais represente par le Ministre d'Etat charge de la Defense Nationale-Delegation Ministerielle pour l'Armement-Direction Technique des Constructions navales, Paris, France

[22] Filed: May 18, 1973

[21] Appl. No.: 361,508

[30] Foreign Application Priority Data
May 18, 1972 France .............................. 72.17848

[52] U.S. Cl. ................................ 340/3 R, 343/5 DP
[51] Int. Cl. ............................. G01s 9/66, G01s 7/66
[58] Field of Search ............ 340/1 R, 3 R, 5 R, 1 C; 343/5 DP, 100 CL

[56] References Cited
UNITED STATES PATENTS
| | | | |
|---|---|---|---|
| 3,047,806 | 7/1962 | Heslop | 343/5 DP |
| 3,277,473 | 10/1966 | Calhoon, Sr. et al. | 343/5 DP |

*Primary Examiner*—Richard A. Farley
*Attorney, Agent, or Firm*—Larson, Taylor & Hinds

[57] ABSTRACT

A system for detecting submarine targets using active sounding equipment provides correlation between echoes received during $N$ successive sweeps. The system includes $N-1$ delay devices, preferably in the form of shift registers, which are serially connected to an input terminal and which provide a delay equal to the duration of a sweep. Storage devices, which can also be shift registers, are individually connected to the outputs of respective delay devices and provide arithmetically increasing storage times. An $N$-input coincidence gate is connected to the outputs of the storage devices.

9 Claims, 9 Drawing Figures

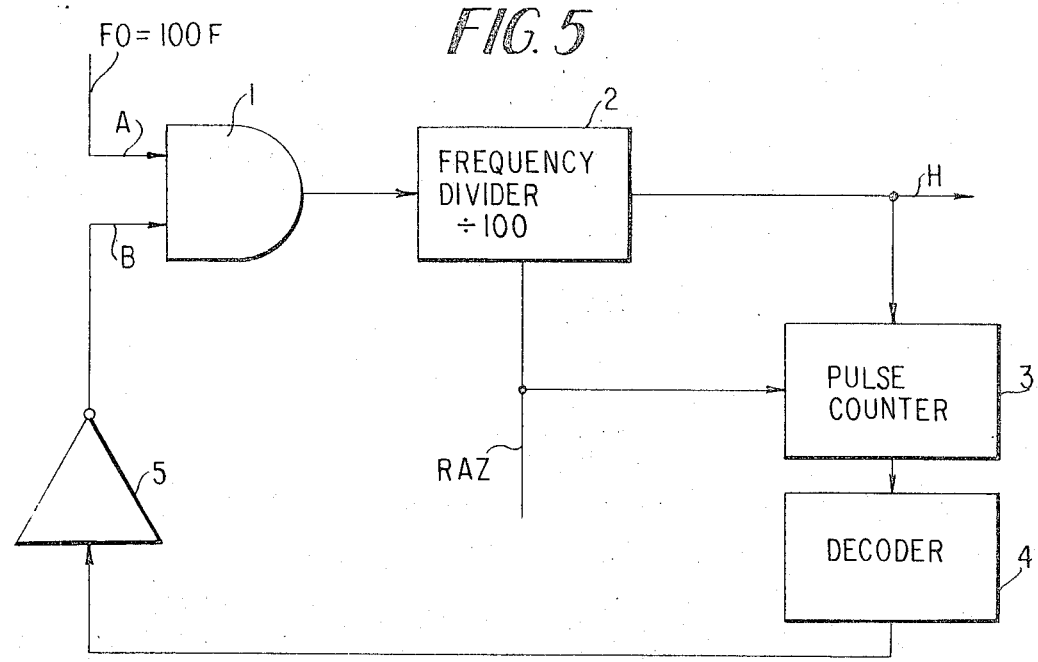

ECHO CORRELATION SYSTEM FOR SUBMARINE DETECTION USING ACTIVE SOUNDING DEVICES

FIELD OF THE INVENTION

The invention relates to the detection of targets such as submarines using active sounding devices.

BACKGROUND OF THE INVENTION

One of the chief problems in the detection of submarine targets is that caused by parasitic echoes. Recent developments in the field permit differentiation between a useful signal and a parasitic signal by logical treatment of the sampled received signals. In particular, for systems using active sounding devices, such an approach makes it possible to completely isolate a useful echo and to eliminate the effects of the parasitic signals, even where intense, if the parasitic signals are clearly shorter in duration than the useful echo.

However, the approach mentioned above suffers certain inherent disadvantages and present "active" detection systems used in detecting submarine targets do not exploit the repetitive nature or character of the phenomenon to be detected.

SUMMARY OF THE INVENTION

The detection system of the present invention, in contrast to prior systems, establishes a temporal correlation between the useful echoes received from a single target in the course of several successive sweeps and thus, as will become more clear hereinafter, provides substantial improvement in the identification of target echoes. The system of the invention, by taking full advantage of recent technological advances, permits the principle of time correlation between successive sweeps to be applied to so-called "panoramic" systems which are made up of a number of identical receivers.

Experience has shown that where weak echoes are produced in $N$ successive sweeps, we do not receive $N$ echoes from the same target but rather a lesser number $n < N$. The system of the invention does not depend on $N$ echoes being received and enables correlation between $n$ received echoes from a single target in the course of $N$ successive sweeps.

Before exploring other aspects of the invention some background is thought to be in order. The invention is, as stated, particularly concerned with active sounding equipment such as sonar, and with such equipment, the operation of sounding device includes recurrent transmitting periods or intervals (e.g., of a duration ranging between 10 and 300 milliseconds) and longer sweep periods or intervals (e.g., of a duration between 2 seconds and 1 minute, depending on the distance between the target and the target seeker). Once a sweep interval is terminated, the next transmission period begins, which is followed by a new sweep, and so on. In general, the target or mark is non-stationary and thus the distance between the seeker and the mark will vary between the instant of impact on the mark of the first transmission and the instant of impact of the second transmission because of the radial displacement of the mark ("mark radial") during the time interval between impacts. Further, the sounding vessel is generally also mobile and hence the radial velocity of the vessel, the so-called "seeker radial," must be taken into account as well. Thus, the distance between the sounding device or seeker and the target or mark is affected by a "total radial" which reflects both the "mark radial" and the "seeker radial." If the beginning of transmission preceding each sweep is taken to be the time origin, an echo will arrive during the course of the sweep taken as the first sweep at a time $T$. The effect of the total radial is to influence the time of appearance of the second echo, appearing during the course of the second sweep, by a factor $\delta$. The echo received from the third sweep is influenced, relative to the first sweep, by a factor which is very close to $2\delta$, the radial varying imperceptibly between two successive sweeps. The total radial has an upper limit. Thus, if the relative movement between the seeker vessel V1 and the target vessel V2 takes place along the same straight line, this value is $+ (V1 + V2)$ if the vessels are moving apart and $- (V1 - V2)$ if the vessels are approaching each other. For a particular sweep duration, the maximum positive radial is expressed, for the second sweep, by a certain maximum delay $\Delta$ between the appearance of the second echo after the first echo. The maximum negative radial is similarly expressed by a certain maximum advance $\Delta$ of the time of appearance of the second echo relative to the first. In a similar manner, the maximum positive radial is expressed by a maximum delay $2\Delta$ between the appearance of the third echo after the first echo and the maximum negative radial is expressed as a maximum advance of $2\Delta$ of the third echo relative to the first.

From the foregoing, it will be seen that if the start of each sweep is taken as the time origin, a correlation will be obtained between (1) a first echo received at a time $T$ during the course of the sweep whose beginning is taken as the origin, (2) a second echo received in the course of the next, following sweep, within the limits $(T - \Delta)$, $(T + \Delta)$ and (3) a third echo received in the course of the next following sweep, within the limits $(T - 2\Delta)$, $(T + 2\Delta)$. Stated differently, the same target will produce three echoes, a first received at time $T$, a second received within the "time window" $T \pm \Delta$ and a third received within the "time window" $T \pm 2\Delta$. The invention enables correlation of the echoes using logic techniques.

It is noted that while a time window beginning at the time $T$ and terminating at the times $\Delta$ or $2\Delta$ (for a positive total radial) is easily provided, it is physically impossible to provide a time window of $\Delta$ or $2\Delta$ relative to a time which is not determined, as in the case of a negative total radial. The system of the invention also overcomes this difficulty.

In accordance with a further important aspect of the invention, the effect of the seeker radial is automatically taken into account thereby permitting a reduction of the width of the time windows, the time windows being then defined solely as a function of a predetermined maximum mark radial. The resultant windows are obviously narrower in width than those determined by the total radial and hence there are, ipso facto, fewer false echoes.

Other features and advantages of the invention will be set forth in, or apparent from, the description of the preferred embodiments of the invention found hereinbelow.

BRIEF DESCRIPTION OF THE DRAWINGS

FIG. 5 is a schematic circuit diagram of an auxiliary synchronizing circuit;

FIG. 6 is a schematic circuit diagram of logic circuit for providing selective correlation of the information inputs relating to the various sweeps;

DESCRIPTION OF THE PREFERRED EMBODIMENTS

Figure 1:
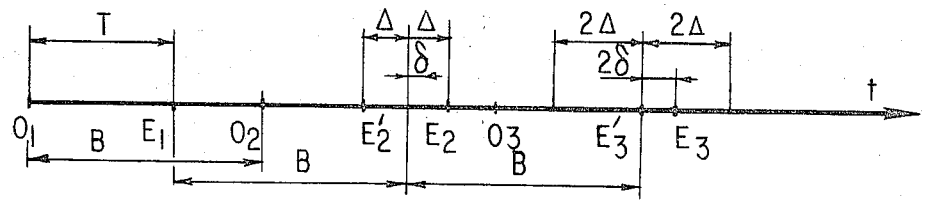
FIGS. 1, 2, 3a and 3b are timing diagrams used in explanation of the operation of the invention.

Referring to FIG. 1, a diagram is provided of the linear times of three successive sweeps denoted $O_1$, $O_2$ and $O_3$, the duration of each sweep being denoted B. As illustrated, in the course of the first sweep $O_1$, an echo is received at $E_1$ at a time T seconds after the beginning of sweep $O_1$. As discussed above, a change in the distance between the seeker and the target or mark caused by radial displacement of the mark, i.e., the mark radial, or caused by the radial displacement of the seeker, i.e., the seeker radial, will cause a variation in the time the echo is received. If the total radial $r$, i.e., the total variation in distance between the sounding device and the target, is zero, a second echo would be received at a time $E'_2$ which is T seconds after the beginning of sweep $O_2$ and which is delayed by B seconds relative to the first echo $E_1$. Similarly, a third echo will be received at $E'_3$, a time T seconds after the beginning of sweep $O_3$ and B seconds after $E'_2$.

Because of the existence of a radial, i.e., with $r$ equal to a positive value, the second echo is actually received at $E_2$, a time $\delta$ seconds after $E'_2$ whereas the third echo is received at $E_3$, a time $2\delta$ seconds after $E'_3$. The term $\delta$ is equal to $(2r/c)B$, where $r$ and $B$ are, as discussed above, the total radial and duration of the sweep respectively, and $c$ is the speed of propagation of the sound waves in water. The factor 2 in the expression $2\delta$ takes into account the doubling of the distance travelled by the sound waves, i.e., represents the sum of the distance out to the target and the distance back.

As discussed hereinabove, $\delta$ must be less than a maximum value $\Delta$, where $\Delta = 2R/c\, B$ where $R$ is the maximum possible value of the total radial $r$ and correspondingly $2\delta$ is less than $2\Delta$. The time windows $\pm\Delta$ and $\pm 2\Delta$ are also shown in FIG. 1.

Figure 2:
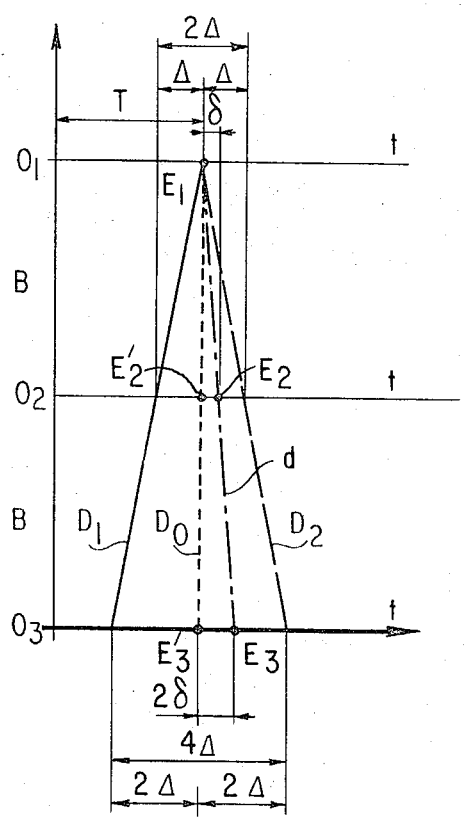

Referring to FIG. 2, the diagram shown is that of FIG. 1 redrawn by aligning the sweep origins $O_1$, $O_2$, $O_3$ which, as stated, are respectively separated in real time by the time interval B. In FIG. 2, a second axis $E_1$–$E'_2$–$E'_3$–$D_o$ is shown, which is parallel to and, spaced by the time interval T, from the axis $O_1$–$O_2$–$O_3$. In addition, two sloped lines $D_1$ and $D_2$ are shown which form a "dunce cap" and which join the abscissa points T, T–$\Delta$, and T–$2\Delta$ and T, T+$\Delta$, and T+$2\Delta$, respectively. It will be appreciated that the second and third echoes coming from the same target as echo $E_1$ must lie within the limits defined by lines $D_1$ and $D_2$. Specifically, echoes $E_2$ and $E_3$ are shown, which are respectively separated in time from echo $E_1$ by the intervals $\delta$ and $2\delta$, as discussed above, and are aligned along a straight line $d$.

Figure 3A:
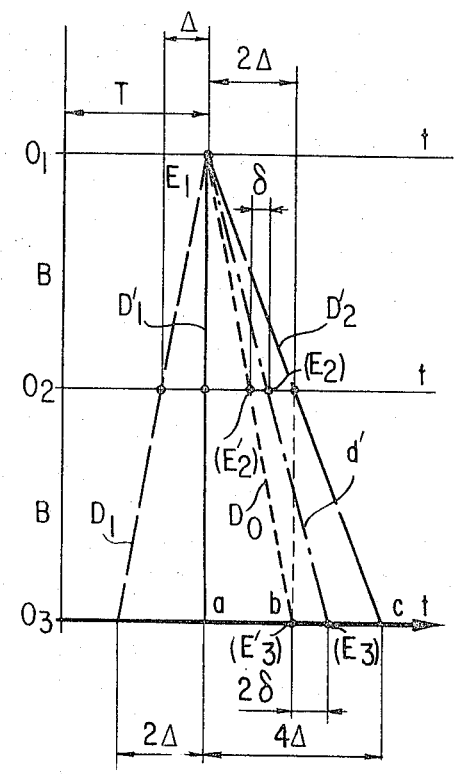

Referring to FIG. 3a, the line $D_1$ of FIG. 2 is pivoted to coincide with a line $D'_2$ which corresponds in position to line $D_o$ of FIG. 2, i.e., extends vertically through the point $E_1$. Further, lines $D_o$, $d$ and $D_2$ are similarly pivoted, $D_o$ being pivoted so that a new line $D'_o$ intersects axis $O_2$ at $(E'_2)$, at a distance or interval of T + $\Delta$, and axis $O_3$ at $(E'_3)$, at a distance or interval of T + 2 $\Delta$, the parentheses designating the new positions of the points of FIG. 3a with reference to FIG. 2. Similarly, a new straight line $D'_2$ intersects axis $O_2$ at a T + 2 $\Delta$ and axis $O_3$ at T + 4 $\Delta$ and new straight line $d'$ intercepts axis $O_2$ at T + $\Delta$ + $\delta$ and axis $O_3$ at T + 2 $\Delta$ + 2 $\delta$. The lines $D'_1$, $D'_o$ and $D'_2$ intersect axis $O_3$ at $a$, $b$, and $c$, respectively, as shown.

It will be understood that the showing at FIG. 3a is a satisfactory physical representation of the echo system in question in that, for each echo, the time origin is known; the origin in question being the time T, the time of arrival of the first echo, notwithstanding the polarity of the radial concerned. The pivoting of the lines $D_1$, $D_o$, $d$ and $D_2$ corresponds to the introduction of a delay of $\Delta$ of the data corresponding to that plotted on axis $O_2$ and delay of 2 $\delta$ for data on axis $O_3$. In the case where the seeker and the mark are approaching each other at maximum speed, the echoes $E_2$ and $E_1$ will exactly correspond to echo $E_1$, but, apart from this special case, the echo $E_1$ must be stored until the arrival of echo $E_2$ and echo $E_2$ stored until the arrival of echo $E_3$. As illustrated the delay of echo $E_3$ relative to echo $E_1$ may be as much as 4 $\Delta$ whereas that between echoes $E_3$ and $E_2$ may be as much as 2 $\Delta$. Hence, the storage circuits involved, which are described hereinbelow, and are termed "time window" circuits, should permit comparison during these periods.

Figure 3B:
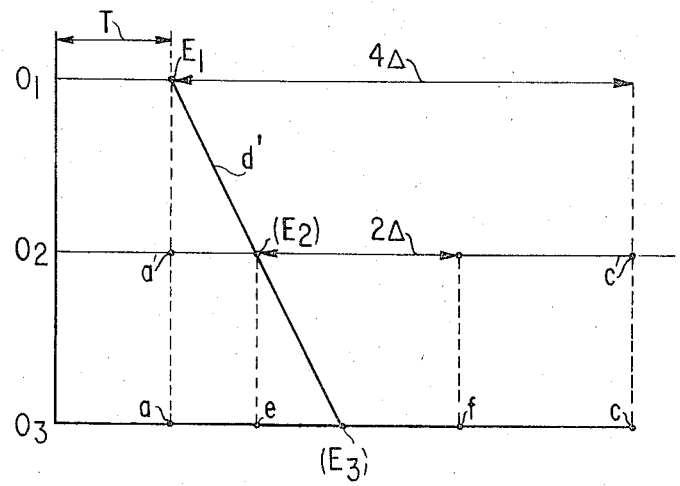

FIG. 3b supplements FIG. 3a and illustrates a window opening corresponding to that discussed above. As shown, the instant of appearance of echo $E_1$ determines the beginning of the time period or zone of 4 $\Delta$ which is represented by the interval $a$–$c$ on axis $O_3$ and $a'$–$c'$ on axis $O_2$. Similarly, the appearance of echo $(E_2)$ determines the time zone 2 $\Delta$ which is represented by the interval $e$–$f$ on axis $O_3$. These time intervals or "waiting" zones correspond to the maximum relative delay that may occur before the appearance of echoes on axis $O_2$ or $O_3$ with time coincidence on three successive sweeps.

Figure 4:
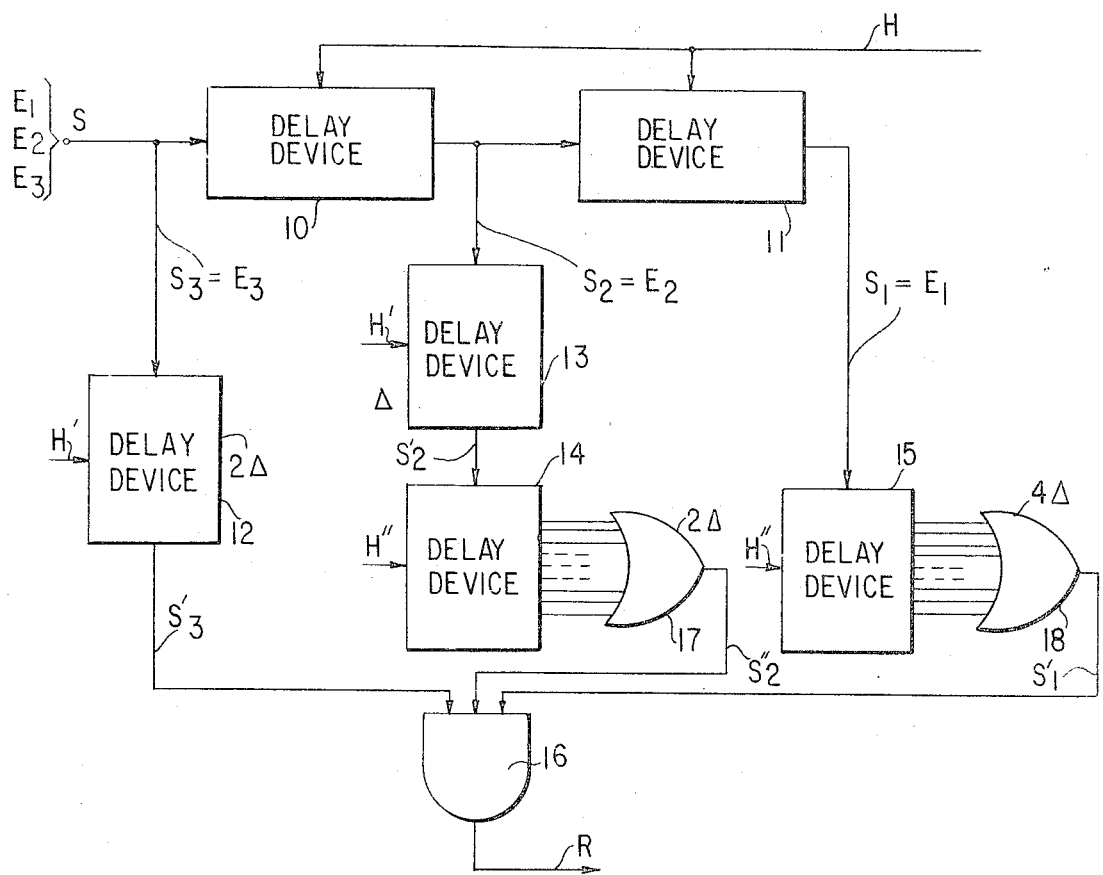
FIG. 4 is a schematic circuit diagram, partly in block form, of a first embodiment of the invention.

Referring to FIG. 4, a circuit is shown which incorporates or implements the principles discussed above relative to FIG. 1 and FIGS. 3a and 3b. The circuit includes an input terminal which receives the echoes $E_1$, $E_2$ and $E_3$ in the form of logic signals to be processed. In this regard it is noted the raw analog signals that are received can be converted into digital logic signals using the apparatus disclosed in my copending application Ser. No. 361,588, filed concurrently herewith and entitled SYSTEM FOR DETECTING WEAK INFORMATION SIGNALS IN NOISY RECEIVER SIGNALS. Input terminal S is connected to a first delay device 10 the output of which is connected to a second delay device 11. Both delay devices 10 and 11 provide a delay equal to B, the duration of a sweep, and each preferably comprises an N-stage shift register controlled by a clock input H. The frequency F of the clock input H is selected so that $1/F \times N = B$ or $F = N/B$. In an exemplary embodiment, shift registers 10 and 11 include 400 stages each furnishing a delay of $B/400$. With the arrangement described, a signal $S_1$, corresponding to the first received echo $E_1$ (i.e., an echo taken arbitrarily as the first echo) and appearing at the output of shift register 11, is delayed an amount 2B with respect to a signal $S_3$ corresponding to the echo $E_3$. The output of shift register 11 is connected to a further delay device 15 which provides a time window of a duration equal to 4 $\Delta$. Input terminal S is also connected to a further delay device 12 which provides a delay equal to 2 $\Delta$. Similarly, the output of shift register 10 is connected to yet another delay device 13 which provides a delay equal to $\Delta$. The output of device 13 is connected to a further delay device generally corresponding to device 14 and providing a delay or time window of 2 $\Delta$. Delay devices 12 and 13 are preferably N-stage shift registers and are each controlled by a clock input H′ while delay devices 14 and 15 are also N-stage shift registers each controlled by a clock H″.

The frequency $F'$ of clock input H′ is selected so that $1/F' \times N_{12} = 2 \Delta$ or $F' = N_{12}/2 \Delta$ where $N_{12}$ is the number of stages in shift register 12. Similarly, $F'$ also equals $N_{13}/\Delta$ where $N_{13}$ is the number of stages of shift register 13.

The number of stages of shift registers 14 and 15 is determined by both the value of the maximum predetermined radial and the clock frequency H′. The clock frequency, F′, is equal to $N_{14}/2 \Delta$ and to $N_{15}/4 \Delta$ with $N_{14}$ and $N_{15}$ being the number of stages in registers 14 and 15 as above. The outputs of the stages of shift registers 14 and 15 are connected to OR gates 17 and 18, respectively, as shown. The outputs of OR gates 17 and 18 are logical "ones" with an input thereto. With proper circuit selection, the clock inputs H′ and H″ can be identical so as to simplify the command circuitry.

The outputs of shift register 12, OR gate 17 and OR gate 18 form the three inputs to a coincidence circuit or AND gate 16 which produces an output R.

As noted in FIG. 4 and mentioned above, signals $S_1$, $S_2$ and $S_3$ correspond to echoes $E_1$, $E_2$ and $E_3$, the circuitry shown in FIG. 4 providing a physical realization of the relationship diagrammed in FIG. 3a. Thus, shift register 11 by providing a delay of B, in effect brings axis $O_1$ into coincidence with axis $O_2$. Similarly, shift register 10 serves to bring the two axis $O_1$ and $O_2$ into coincidence with axis $O_3$. Further, shift register 12 acts to shift the points along abscissa of axis $O_3$ by the amount 2 $\Delta$ while shift register 13 acts to shift all of the points along the abscissa of axis $O_2$ by the amount $\Delta$ (compare FIG. 3a, as well as 3b). Shift register 14 serves to store signal $E_2$ for a time interval 2 $\Delta$ while shift register 15 serves to store signal $E_3$ for duration 4 $\Delta$ (again, compare FIGS. 3 a and 3b).

Under the conditions described above, the delayed echo $S'_3$ (which is a delayed version of signal $S_3$, i.e., echo $E_3$) is made to be time coincident with delayed echo signal $S'_1$ between abscissa points $a$ and $c$ (see FIG. 3a) and with delayed echo signal $S'_2$ between abscissa points $a$ and $b$. Thus, if the three echoes $E_1$, $E_2$ and $E_3$ are from the same target, the three inputs at AND gate 16 will be in coincidence and the output signal R will be produced which represents the correlation between three echoes received in succession from the same target.

It should be noted that in accordance with a simplified embodiment, the time windows referred to above can be provided by monostable multivibrators having "on" times of 2 $\Delta$ and 4 $\Delta$. Under these circumstances, OR gates 17 and 18 are omitted and elements 14 and 15 are connected directly to the associated inputs of AND gate 16.

It will be understood that it is important that the clock input which controls advancing or stepping of the shift registers be synchronized as closely as possible to the start of transmission by the sounding device, referred to hereinafter as to the transmission reference. However, the instant of transmission may fluctuate considerably and thus may result in a serious disturbance in the operation of the system just described, which, as mentioned, depends on reliable timing to ensure proper coincidence. To reduce this effect to a negligible amount, a pilot frequency, $F_o$, is utilized which is much higher than the frequency, $F$, of the clock input H (e.g., $F_o = 100F$). Thus the frequency of the clock input H is synchronized with respect to the transmission reference, with a maximum error equal to a single period of the pilot frequency $F_o$. This technique is preferably implemented by a circuit such as shown in FIG. 5.

Referring to FIG. 5, an AND gate 1 includes a first input A connected to receive the pilot frequency $F_o$ and a second input for receiving a control or enabling signal. The output of AND gate 1 is connected to a divide by 100 frequency divider 2 whose output, which forms clock input H, is, in turn, connected to a pulse counter 3 having a capacity of 400. As indicated by the inputs RAZ the divider 2 and counter 3 are reset to zero by each transmission. The output of counter 3 is connected to a decoder 4 which determines when the counter 3 counts to 400 and which is connected through an inverter 5 to the enabling input B of AND gate 1.

In operation, at the end of a reference transmission, divider 2 and counter 3 are reset to zero. Decoder 4 produces an output corresponding to "400 not reached" which, after inversion, enables passage of the pilot frequency $F_o$ through AND gate 1 to divider 2. The first pulse of frequency $F_o$ will be presented to divider 2 with a maximum delay equal to the period thereof, i.e., $1/F_o = 1/100F$. The first pulse on the clock input line H occurs after the passage of 100 pulses of frequency $F_o$, i.e., after time $1/F_o \times 100 = 1/H$. Thus, it will be seen that the maximum separation between the end of the pulse transmission and the first pulse on clock line $H$ is $1/F_o$. Thus the readjustment of the clock relative to the beginning of transmission is effected at a time which is, at the maximum, 1 percent of the frequency $F$, whatever value $F$ may take. When counter 3 counts to 400, decoder 4 produces a "400 reached" output which, when inverted by inverter 5, prevents subsequent counting. Thus, the system is blocked until the next transmission.

The frequency $F_o$ is selected so that the last clock pulse on clock input line H is produced just prior to the beginning of the time during which there may be relative variation in the instant of transmission so that the system is prepared for the upcoming synchronization sequence. It is noted that choosing an excessively high value for the frequency $F_o$ could entail blocking of the system operation during the course of a sweep which, while not disturbing the overall operation of the system, could cause the loss of data arriving between the instant of blocking and the actual end of the sweep then in progress.

Referring to FIG. 6, a logic circuit is shown which permits selection of the correlation between signals $S'_1$, $S''_2$ and $S'_3$ of FIG. 4, corresponding to the three successive sweeps. The inputs $12''$, $17''$ and $18''$ shown in FIG. 6 correspond to the outputs of shift register 12 and OR gates 17 and 18, respectively, with the signal $S'_3$ corresponding to sweep three, $S''_2$ to sweep two and $S'_1$ to sweep one. Further, AND gate 16 corresponds to AND gate 16 of FIG. 1.

The circuit of FIG. 6 additionally includes a further AND gate 30 which receives signals $S'_1$ and $S''_2$ and produces an output $p = S'_1 \cdot S''_2$. Similarly, two further AND gates 31 and 32 respectively receive signals $S'_3$ and $S''_2$ and $S'_3$ and $S'_1$ and produce respective outputs $q = S'_3 \cdot S''_2$ and $r = S'_3 \cdot S'_1$. The AND gate 16' produces an output $s = S'_1 \cdot S''_2 \cdot S'_3$. Signals $p$, $q$, $r$ form the inputs to an OR gate 33 which thus produces an output $t = p + q + r$. A further AND gate 34 includes a first input connected to the output, S, of AND gate 16 and a second input connected to receive a manual command signal X. A parallel AND gate 35 includes a first input connected to receive the output, $t$, of OR gate 33 and a second input connected to a signal $\overline{X}$ produced by an inverter 36 connected to receive command signal X. The AND gates 35 and 34 produce respective outputs $u$ and $v$ which form the inputs to an OR gate 37 producing an output $w$.

It will be appreciated from the foregoing that the logic output $W$ is of the form $W = X(S'_1 \cdot S'_2 \cdot S'_3) + \overline{X}(S'_1 \cdot S''_2 + S'_2 \cdot S'_3 + S'_3 \cdot S'_1)$. With $X = 1$, $W$ provides correlation of the three echoes and with $X = 0$ (and hence $\overline{X} = 1$), $W$ provides correlation between one of the pairs of the echoes out of three.

Figure 7:
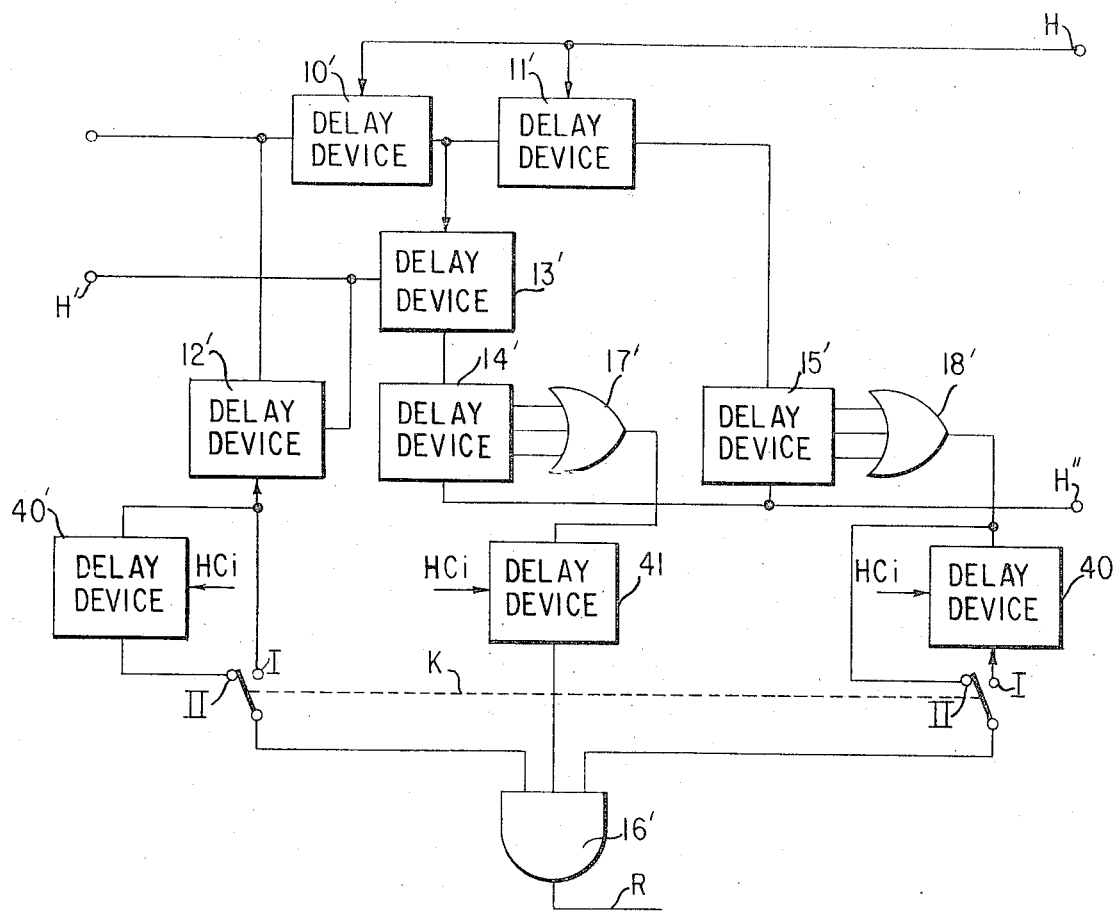
FIG. 7 is a schematic circuit diagram similar to that of FIG. 4 which permits reduction of the width of the time windows.

Referring to FIG. 7, the circuit shown therein is a modification of FIG. 4 and like elements have been given the same numbers with prime superscripts. The system of FIG. 7 differs principally from that of FIG. 4 in providing correction of the radial seeker so as to permit a construction or shrinking of the time windows.

Thus, in FIG. 7, a two-position switch K, in a first position, denoted I, provides a direct connection between the output of shift register 12' and the corresponding input of AND gate 16' while connecting a delay device 40, preferably of the shift register type, between the output of OR gate 18' and the corresponding input of AND gate 16. Shift register 40 is controlled by a clock input HC$i$ which is described in more detail hereinbelow. In the second position thereof, denoted II, switch K, provides a direct connection between OR gate 18' and AND gate 16' and connects a delay device 40', identical to device 40, between shift register 12 and AND gate 16. Delay device 40' is a shift register controlled by clock HC$i$.

The structure carrying the sounding device in question provides forward, aft and transverse transmission paths, and the latter (corresponding to 90° and 270° positions) does not have to undergo correction for change in the position of the seeker radial. It is with these transverse paths that the system of FIG. 4 is adopted, while with the other paths, the system of FIG. 7 is used. For forward paths, the switch K is in position II while for aft paths, switch K is in position I.

Considering the operation of the system of FIG. 7 for forward transmission paths, as discussed above, the effect of the seeker radial is to cause the echo of the second sweep to arrive at time δ before the relative time of the arrival of the echo of the first sweep and the echo of the third sweep to arrive at a time 2 δ before the relative time of arrival of the echo of the first sweep because the distance between the seeker and the mark tends to decrease over the course of time because of the relative movement between the two. Thus, to ensure that the system of FIG. 4 operates in conformity with the diagram shown in FIG. 3a, the second echo and third echo are retarded in a ratio of 1 to 2.

It will be understood that the system described is located on the seeker carrier itself which may be a ship or the like and hence the speed of the seeker and the position of the receiving path for the echoes are always known. The delays involved are proportional to the speed vector for the path under consideration, i.e., the delays must take into consideration both the speed involved as well as the cosine of the position in question. Since the effect of seeker speed is zero for the seeker carrier transverse to the carrier, the paths for 90° and 270° positions require no correction.

The reference of the angular positions under discussion are taken relative to the longitudinal axis of the carrier and the direction of angular rotation is taken as clockwise. Path one, corresponding to position 0, is, therefore, the path corresponding to the forward direction of the carrier for the active sounding device. In accordance with an exemplary, presently preferred embodiment of the invention, a sounding device is used which provides 24 paths, so that the angular separation between the axes of adjacent paths is 15°. The cosines of the different angular positions, taken in pairs, are either equal or symmetrical making it possible to use a low number of frequencies, six in the example under consideration, to provide correction for all 24 paths. Considering the forward paths, i.e., paths one to seven (0° or 90°) and 19 to 24 (270° to 345°), the effect of the speed of the seeker is 100 percent for path one, approximately 75 percent for paths two and 24, 50 percent for paths three and 23, 30 percent for paths four and 22, 14 percent for paths five and 21, 3 percent for paths six and 20 and 0 percent for paths seven (90°) and 19 (270°). These same percentages obtain for rearward paths but the effect of the speed is in the opposite direction with the seeker carrier moving away from the mark.

Figure 8:
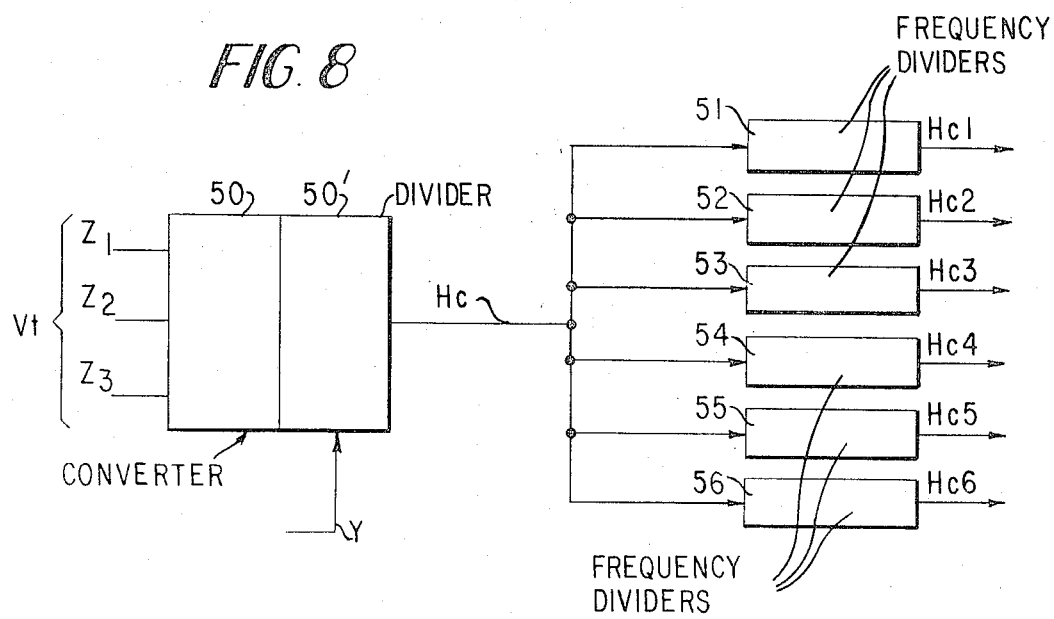
FIG. 8 is a schematic circuit diagram of a frequency generator circuit for generating the frequencies shown in FIG. 7.

Referring to FIG. 8, there is shown an arrangement for providing the percentages referred to above. The percentages are obtained from a single input frequency Hc which is 100 times that required for path one and six frequency dividers 51, 52, 53, 54, 55 and 56 which respectively divide by 100, 75, 50, 30, 14 and three to provide the necessary correction frequencies Hc1 to Hc6 (HC$i$ where $i = 1, 2, \ldots 6$). The frequency Hc is itself inversely proportional to the seeker speed, V$t$, the latter being determined from a general slaving system controlled by apparatus for determining the speed of the carrier vessel. The information is provided as an electrical input on a three wire network $z_1$, $z_2$ and $z_3$. This input is connected to a converter 50/50' which produces the output correction frequency Hc, where $Hc = k/Vt$ and $k$ is a proportionality constant. Block 50' of the converter is a divider programmed so as to permit adjustment of the frequency HC$i$ as a function of the duration of the sweep B as provided by command input Y.

Referring again to FIG. 7, delay devices 40 and 41 are, as stated, shift registers and hence the time, $\tau$, necessary for information to pass therethrough may be expressed by the equation $\tau = N \times 1/HCi$ where $N$ is the number of stages of the register and $HCi$ is the frequency of the control clock. But $HCi = Hc/n$ where $Hc$ is the correction frequency and $n$ is the division ratio of the path in question, so that, remembering that $Hc = k/Vt$ the expression for $\tau$ becomes $\tau = Nn/k \cdot Vt$. Thus, the time $\tau$, the delay applied to the input data, is clearly proportional to both the seeker speed ($Vt$) and the division coefficient $n$ which is a function of the transmission path. If shift register 41 comprises $N$ stages (50, for example), register 40 comprises $2N$ stages (100).

The maximum total radial to be compensated by the delays and windows $2\Delta$ or $4\Delta$ comprises a component, $\Delta t$, due to the seeker radial and a component, $\Delta b$, due to the mark radial, with $\Delta = \Delta t + \Delta b$. The approach described above permits calculation and suppression of the term $\Delta t$ so that the data presented at the inputs of coincident gate 16 are affected only by the term $\Delta b$. Hence it is possible to provide delay durations and time windows based solely on the effect of the mark radial. Such an approach is identical to that described but the delays provided by registers 12, 13, 14 and 15 are calculated using information regarding the mark radial only. It is noted that with an active sounding device the speed of the seeker vessel may range between 0 and 30 knots while that of the mark, in the case where the mark is a submarine, may range between 0 and 15 knots. Hence the outer limits of the measuring differential are ± 45 knots for a system that does not include seeker correction and the corresponding time windows required are simply too long in duration to enable practical implementation of the system. This differential is reduced to ± 15 knots if seeker correction is provided which enables the system to be implemented in relatively simple manner.

Although the invention has been described relative to exemplary embodiments thereof, it will be understood by those skilled in the art that variations and modifications can be effected in these embodiments without departing from the scope and spirit of the invention.

I claim:

1. A system for treating the echo signals received by an active sounding device to provide correlation between echoes received during the course of $N$ successive sweeps, said system comprising first means including an input terminal and $N-1$ serially connected delay devices each providing a delay equal to the duration $B$ of a sweep; second means including $N$ storage means comprising a first storage means connected to said input terminal and $N-1$ further storage means connected to the outputs of said $N-1$ devices and providing arithmetically increasing storage times; and an $N$-input coincident gate connected to the outputs of said $N$ storage means.

2. A system as claimed in claim 1 wherein said $N-1$ storage means each comprise a further delay device and a memory device, the outputs of said memory devices being connected to an OR circuit whose output forms a said input to said coincidence gate.

3. A system as claimed in claim 2 wherein said delay devices and said memory devices comprise shift registers whose clock inputs are connected to receive the same clock signals.

4. A system as claimed in claim 1 wherein said first means comprises first and second shift registers each providing a delay of a duration $B$, and wherein said first storage means of said second means comprises a shift register providing a delay of duration $2\Delta$ and said $N-1$ further storage means comprises two further storage means respectively comprising a shift register providing a storage time of duration $2\Delta$ connected in series with a shift register providing a delay of duration $\Delta$, and a shift register providing a storage time of duration $4\Delta$, where $\Delta = 2R/c \cdot B$, where $R$ is the maximum possible total radial, $c$ is the speed of propagation of sound waves in water and $B$ is the duration of a sweep and the total radial is defined as the algebraic sum of the velocity of the target providing the echoes and the velocity of the sounding device.

5. A system as claimed in claim 4 wherein a clock frequency, $H$, is produced by means comprising frequency oscillator for providing clock pulses of a frequency $kH$, a counter-divider for dividing the output of said oscillator by $k$ and a second counter-divider for dividing by $p$, where $p$ is the number of stages of the shift registers providing a total delay of duration $B$.

6. A system as claimed in claim 1 further comprising a plurality of further coincidence gates, the outputs of said $N$ storage means being connected in all possible combinations taken two at a time to the inputs of said further coincidence gates, and logic circuit means connected to the output of said $N$-input coincidence gate and to the outputs of said further coincidence gates, said logic circuit being connected to receive a manual command signal and comprising an OR gate, connected to the output thereof, for providing, responsive to a first said command signal, the correlation of $N$ echoes taken together and for providing, responsive to a second said command signal, one of the correlations of $N$ echoes taken two at a time.

7. A system as claimed in claim 6 wherein said command signal comprises a binary command signal $X$ and said OR gate providing correlation of $N$ echoes taken together for $X = 1$ and one of the correlations of $N$ echoes taken two at a time for $X = 0$.

8. A system as claimed in claim 3 wherein said $N-1$ storage means comprise two storage means, each including supplemental shift registers, the delay provided by one of said supplemental shift registers being twice that provided by the other, said supplemental shift registers being controlled by a clock input having a frequency proportional to the speed of the vessel carrying the active sounding device and inversely proportional to the approximate cosine of the angle of the path to the target producing said echoes relative to the forward path of the vessel, said path to the target being taken among the forward paths.

9. A system as claimed in claim 3 wherein said $N-1$ storage means comprise two storage means, and wherein a supplemental shift register is connected in series with each said delay device of said first means, said supplemental shift registers providing equal delay relative to each other and being controlled by a clock input having a frequency proportional to the speed of the vessel carrying the active sounding device and inversely proportional to the approximate cosine of the angle of position of the path to the target producing said echoes relative to the aft path of the vessel, said path to the target being taken among the aft paths.

* * * * *